United States Patent
Sutherland, III et al.

(10) Patent No.: US 10,927,331 B2
(45) Date of Patent: Feb. 23, 2021

(54) DISSOLVABLE DETERGENT POUCH AND METHOD

(71) Applicant: Sutherland Products, Inc., Mayodan, NC (US)

(72) Inventors: Charles T. Sutherland, III, Mayodan, NC (US); Stuart Morgan Sutherland, Stokesdale, NC (US); James Richard Daniel Sutherland, Mayodan, NC (US); Marc Alan Mason, Quaker Gap, NC (US)

(73) Assignee: SUTHERLAND PRODUCTS, INC., Mayodan, NC (US)

( * ) Notice: Subject to any disclaimer, the term of this patent is extended or adjusted under 35 U.S.C. 154(b) by 449 days.

(21) Appl. No.: 15/432,403

(22) Filed: Feb. 14, 2017

(65) Prior Publication Data

US 2017/0152465 A1   Jun. 1, 2017

(51) Int. Cl.
| | |
|---|---|
| *C11D 17/04* | (2006.01) |
| *B65D 65/46* | (2006.01) |
| *C11D 17/06* | (2006.01) |
| *C11D 3/22* | (2006.01) |
| *C11D 3/10* | (2006.01) |
| *C11D 3/08* | (2006.01) |
| *C11D 1/66* | (2006.01) |
| *C11D 11/00* | (2006.01) |
| *C11D 1/72* | (2006.01) |

(52) U.S. Cl.
CPC ............ *C11D 17/042* (2013.01); *B65D 65/46* (2013.01); *B65D 65/466* (2013.01); *C11D 1/66* (2013.01); *C11D 1/72* (2013.01); *C11D 3/08* (2013.01); *C11D 3/10* (2013.01); *C11D 3/225* (2013.01); *C11D 11/0017* (2013.01); *C11D 11/0023* (2013.01); *C11D 17/044* (2013.01); *C11D 17/06* (2013.01); *B65D 2215/00* (2013.01); *B65D 2565/382* (2013.01)

(58) Field of Classification Search
CPC ..... C11D 17/042; C11D 17/06; C11D 17/044; C11D 3/225; C11D 3/10; C11D 3/08; C11D 1/66; C11D 1/72; C11D 11/0017; C11D 11/0023; B65D 65/466; B65D 2565/382; B65D 2215/00
See application file for complete search history.

(56) References Cited

U.S. PATENT DOCUMENTS

| | | | |
|---|---|---|---|
| 4,806,261 A * | 2/1989 | Ciallella | C11D 3/0036 206/0.5 |
| 6,541,439 B1 | 4/2003 | Zabarylo | |
| 6,787,514 B2 | 9/2004 | Hinton | |
| 7,386,971 B2 | 6/2008 | Catlin et al. | |
| 7,424,797 B2 | 9/2008 | Duffield | |
| 9,394,092 B2 | 7/2016 | Lee et al. | |
| 2015/0071572 A1 | 3/2015 | Dreher et al. | |
| 2015/0072915 A1* | 3/2015 | Dreher | B32B 37/0076 510/441 |
| 2015/0251783 A1 | 9/2015 | Orndorff | |
| 2015/0336692 A1 | 11/2015 | Sanz et al. | |
| 2015/0360837 A1 | 12/2015 | Perez-Prat Vinuesa et al. | |
| 2016/0017264 A1 | 1/2016 | Cumming et al. | |
| 2016/0068787 A1 | 3/2016 | Casella et al. | |
| 2016/0102278 A1 | 4/2016 | Labeque et al. | |
| 2016/0102279 A1 | 4/2016 | Labeque et al. | |
| 2016/0312157 A1 | 10/2016 | Haugaard | |
| 2016/0369758 A1 | 12/2016 | Jeppesen et al. | |

OTHER PUBLICATIONS

Charlies Soap Inc. Laundry Powder Jun. 15, 2013 https://translate.google.com/translate?hl=en&sl=ko&u=http://m.blog.naver.com/claude_bl/140191203896&prev=search.*
MSDS Charlies Soap Laundry Powder, Feb. 17, 2012.*

* cited by examiner

*Primary Examiner* — Amina S Khan
(74) *Attorney, Agent, or Firm* — Shumaker, Loop & Kendrick, LLP

(57) ABSTRACT

A detergent pouch may be made from a dissolvable paper which completely dissolves upon contact with liquid water thereby releasing the detergent contained within the pouch. The dissolvable paper may be a Cellulose gum such as Carboxymethyl Cellulose. The dissolvable paper is free from any coloring, dyes, impurities and other toxins. The detergent may be laundry detergent such as Sodium Carbonate, C12-15 Pareth-2, and Sodium Metasilicate which is free from any fillers, perfumes, coloring agents, or brighteners. The paper pouch and the powder detergent may be safe for septic wastewater treatment systems, biodegradable, and hypoallergenic. The paper pouch may be non-toxic.

1 Claim, 4 Drawing Sheets

DISSOLVABLE DETERGENT POUCH AND METHOD

TECHNICAL FIELD AND BACKGROUND OF THE INVENTION

The present invention relates generally to the field of detergents and more specifically to the field of dissolvable single-load detergent packets.

Detergents have long been used in place of, or in addition to, lyes, soaps, bleaches, surfactants, and other cleaning agents used to clean fabric, garments, dishware, and other household items. More recently, single-load detergent packets have been utilized which contain a quantity of detergent for a single use. These packets typically contain a highly concentrated liquid detergent encapsulated by a dissolvable plastic. The dissolvable plastic is typically transparent such that the contents of the packet are visible. Other dissolvable plastics are colored with attractive coloring and branding.

These dissolvable plastic packets may include bleaches, soaps, fillers, coloring, perfumes, and other additives in combination with and in addition to the liquid detergent. Many of the ingredients contained in the packets currently used are unsafe such that, when used, the harmful ingredients remain on the fabric, garments, dishware, and other household items washed with the packets.

Worse, because of the shape, coloring, and other features, children are attracted to the packets which utilize the dissolvable plastics because they resemble candy and toys. The American Association of Poison Control Centers (AAPCC) reports that Poison centers receive many calls each year about children getting into traditional laundry detergent. The AAPCC states that swallowing it often causes mild stomach upset, if there are any symptoms at all. However, poison center experts say the new highly concentrated single-load liquid laundry detergent packets which are contained in the disposable plastics are different. Some children who have gotten the product in their mouths have had excessive vomiting, wheezing, gasping, throat swelling and loss of consciousness. Some children have had breathing problems serious enough to require a ventilator to help them breathe. There have also been reports of corneal abrasions (scratches to the eyes), severe irritation and temporary loss of vision when the detergent gets into children's eyes.

Similarly, American Academy of Pediatrics (AAP) recently published a study that found that there were 62,254 children younger than 6 years old exposed to laundry and dishwasher detergents from 2013 to 2014. The number of exposures to detergent increased over the study period, but the increase was greatest for laundry detergent packets (17.0%) and dishwasher detergent packets (14.0%). Eighty-five percent of children were exposed through ingestion. The odds of clinical effects (3.9-8.2), hospitalization (4.8-23.5), intubation (6.9-71.3), and serious medical outcomes (8.4-22.6) were significantly higher for laundry detergent packet exposures than for other types of detergent. There were 117 children who required intubation, and 104 of these were exposed to laundry detergent packets. There were 2 deaths associated with laundry detergent packets. The AAP concluded that pediatric laundry detergent packet exposures are more severe than laundry detergent non-packet and dishwasher detergent (packet and non-packet) exposures. Pediatric exposures to laundry detergent packets increased by 17% during the study period nationally and should be closely monitored to assess the effectiveness of the newly adopted voluntary safety standard; this standard should be strengthened if the number of exposures does not demonstrate a substantial decrease.

Thus, there is a need in the art for a laundry detergent packet which is free from toxins, which is hypoallergenic, which is safe for the environment, which allows a user to detoxify fabric and other household items, which is safe to have around children, and is not an attractive nuisance to children.

BRIEF SUMMARY OF THE INVENTION

The present invention includes a dissolvable pouch made from white paper, not clear plastic. The pouch contains white powdered detergent which is safe for anything washable, safe for the environment, hypoallergenic, and contains no brighteners, perfumes, or fillers. The pouch of the present invention is not an attractive nuisance to children and does not resemble candy or a toy. The paper pouch is non-toxic.

These and other objects of the present invention are achieved by providing a single use paper pouch and a powder detergent sealed within the paper pouch. The paper pouch dissolves upon contact with liquid water thereby releasing the powder detergent.

The pouch may be used to detoxify a load of fabric by following the steps of first cleaning the washing machine by placing a quantity of rags into a washing machine, placing one of the pouches into the washing machine, and operating the washing machine. Next, selecting the load of fabric to detoxify, placing the load of fabric into the washing machine, placing one of the pouches into the washing machine, and operating the washing machine. Next, placing one of the pouches into the washing machine after the washing machine has washed the fabric in the preceding step, and operating the washing machine. Next, placing one of the pouches into the washing machine after the washing machine has washed the fabric in the preceding step, and operating the washing machine and finally, removing the detoxified fabric from the washing machine.

According to one embodiment of the invention, the paper pouch is made from a Cellulose gum.

According to another embodiment of the invention, the Cellulose gum is Carboxymethyl Cellulose.

According to another embodiment of the invention, the Carboxymethyl Cellulose has a plain white color and is characterized by an absence of any other color.

According to another embodiment of the invention the powder detergent is a laundry detergent for cleaning fabric, wherein the laundry detergent comprises Sodium Carbonate, C12-15 Pareth-2, and Sodium Metasilicate.

According to another embodiment of the invention, the powder detergent is a dishwashing detergent for cleaning pots, pans, dishes, and other kitchen utensils.

According to another embodiment of the invention, the pouch is produced on a form/fill machine.

According to another embodiment of the invention, the pouch is characterized by a lack of any fillers other than the powder detergent itself and the powder detergent is characterized by a lack of any perfumes, any coloring agents, and any brighteners.

According to another embodiment of the invention, the paper pouch and the powder detergent is safe for septic and wastewater treatment systems, biodegradable, and hypoallergenic.

According to another embodiment of the invention, the paper pouch is non-toxic.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

Figure 1:
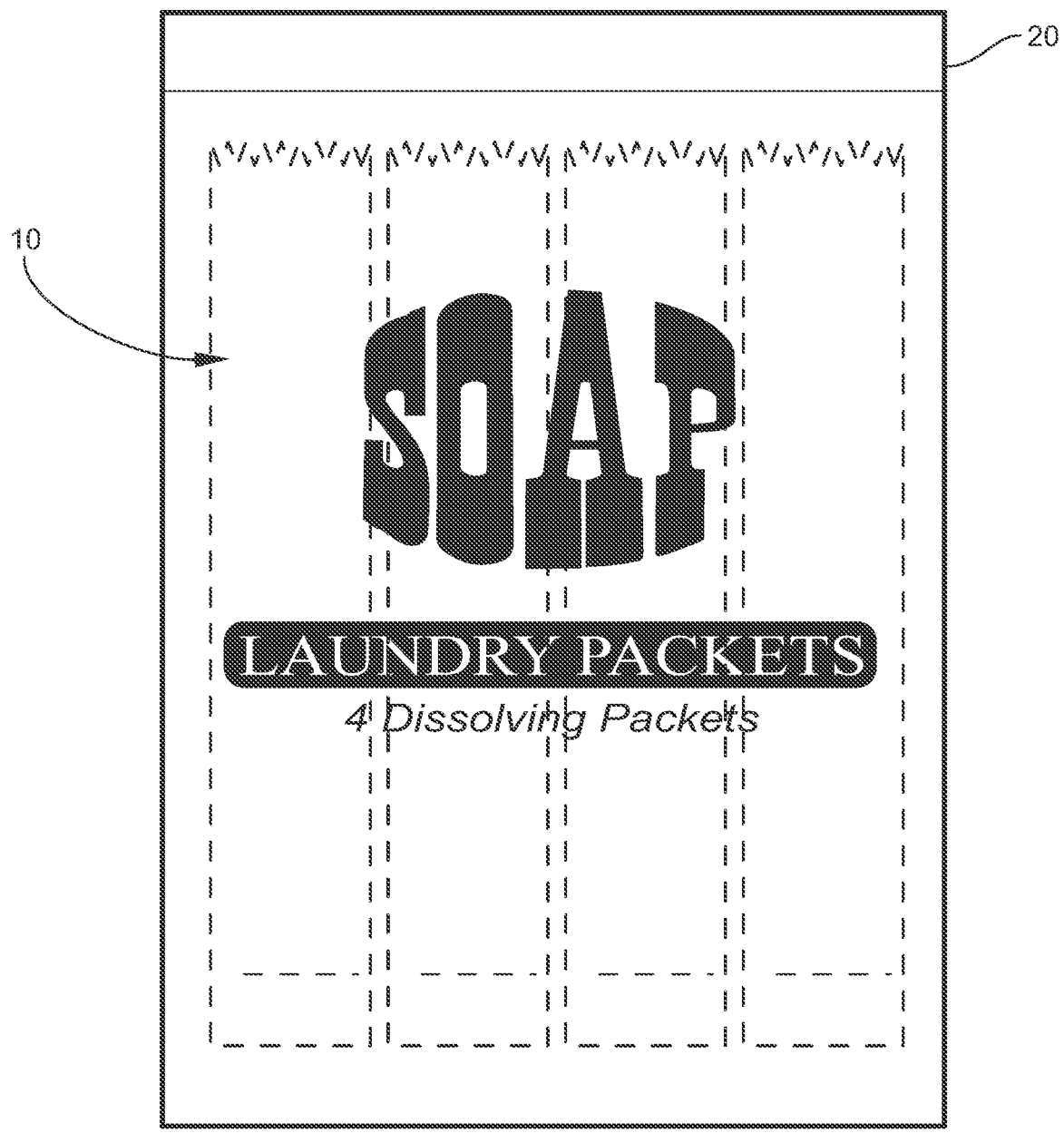
FIG. 1 is a side view of a bag containing the pouches according to the present invention.
Figure 2:
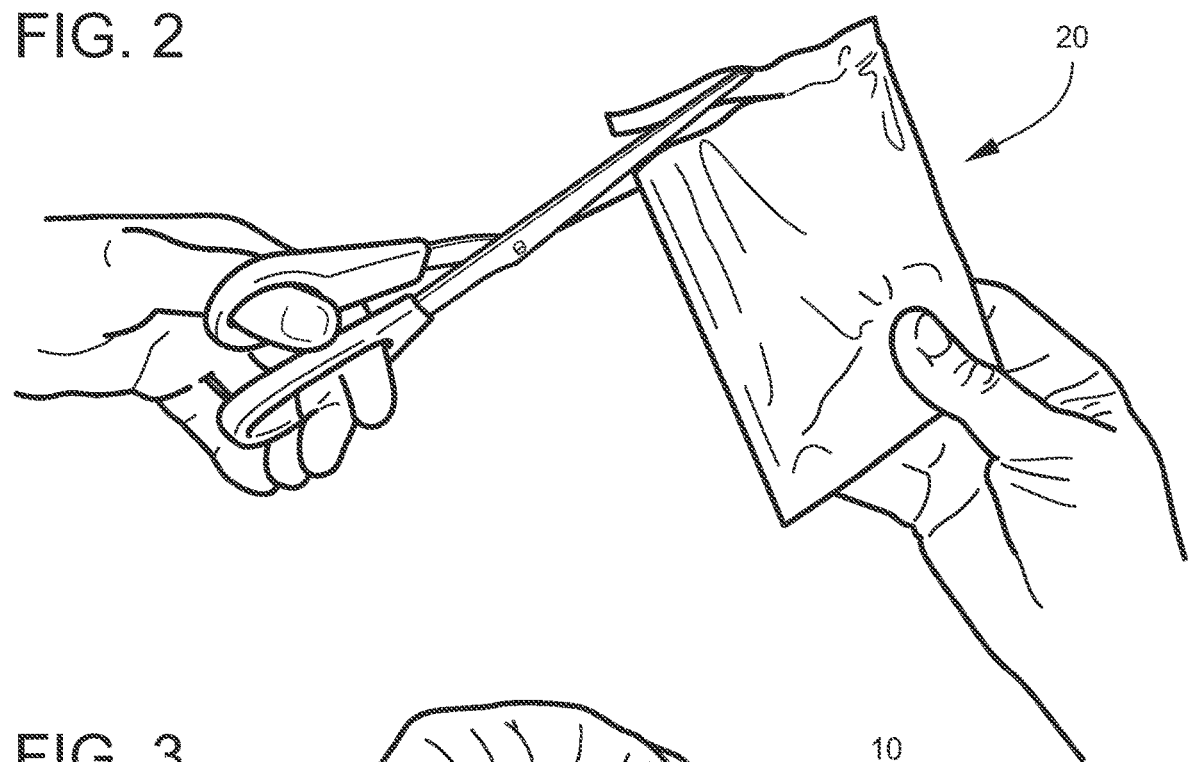
FIG. 2 is a perspective environmental view of a user opening the bag containing the pouches according to the present invention.
Figure 3:
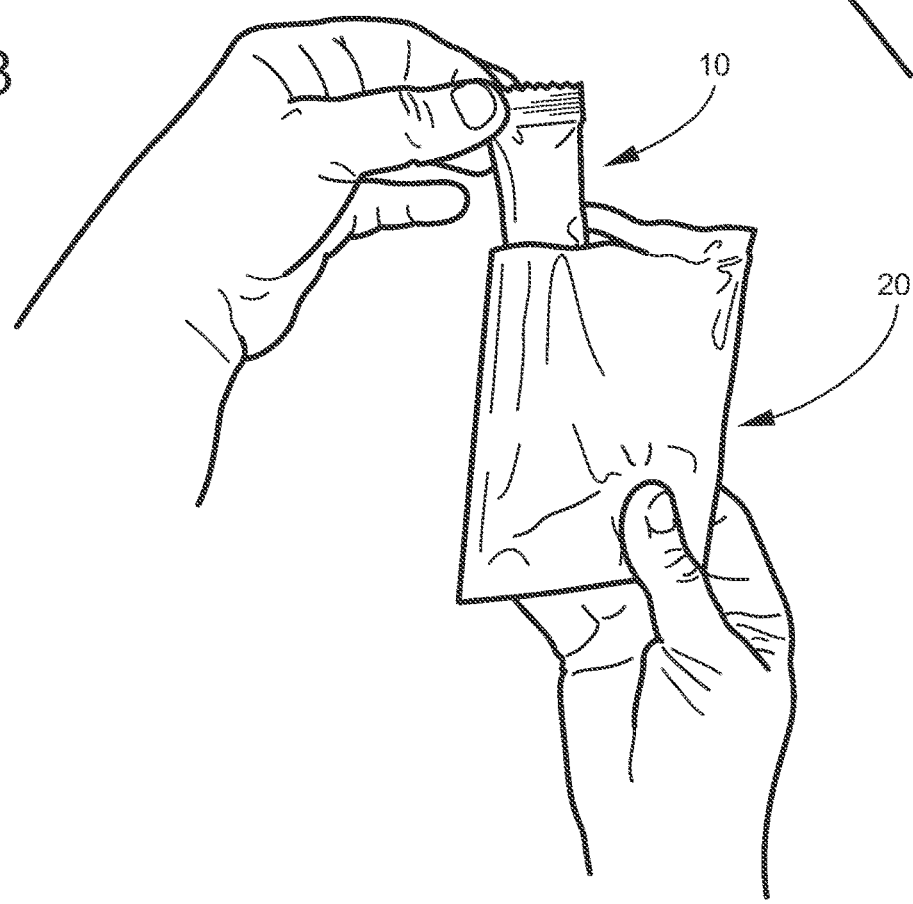
FIG. 3 is a perspective environmental view of a user removing a pouch from the bag containing the pouches according to the present invention.
Figure 4:
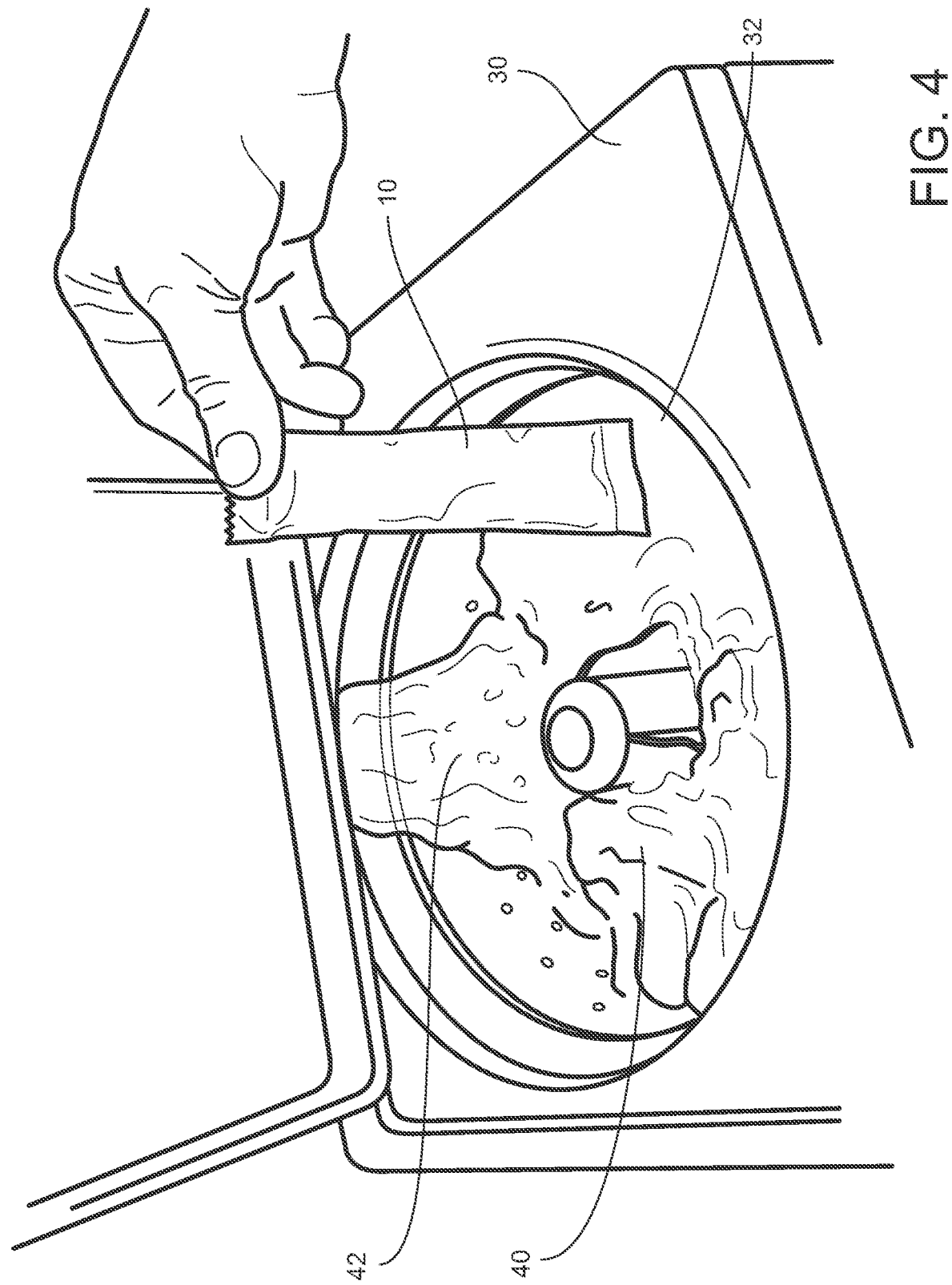
FIG. 4 is a perspective environmental view of a user placing a pouch into a washing machine according to the present invention.

Referring to FIG. 1, the paper pouches 10 of the present invention may be packaged in a larger bag 20 containing a plurality of pouches 10. A user may tear or cut open the bag 20 as shown in FIG. 2. The user may then remove the paper pouch 10 from the bag 20 as shown in FIG. 3. As shown in FIG. 4, the user may then load a washing machine 30 with garments 40 as liquid water 42 fills the machine 30. The user may then place the paper pouch 10 into the opening 32 of a washing machine 30.

Figure 5:
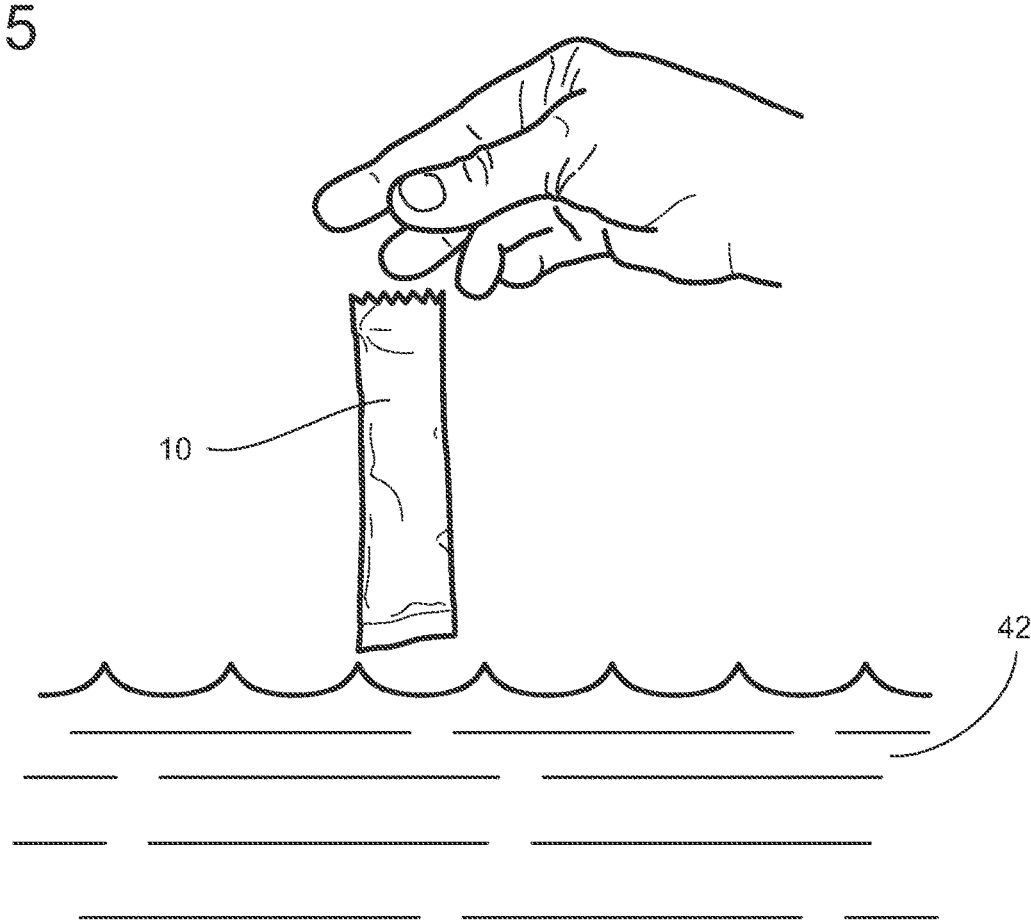
FIG. 5 is a side view of a user placing a pouch into a fluid according to the present invention.
Figure 6:
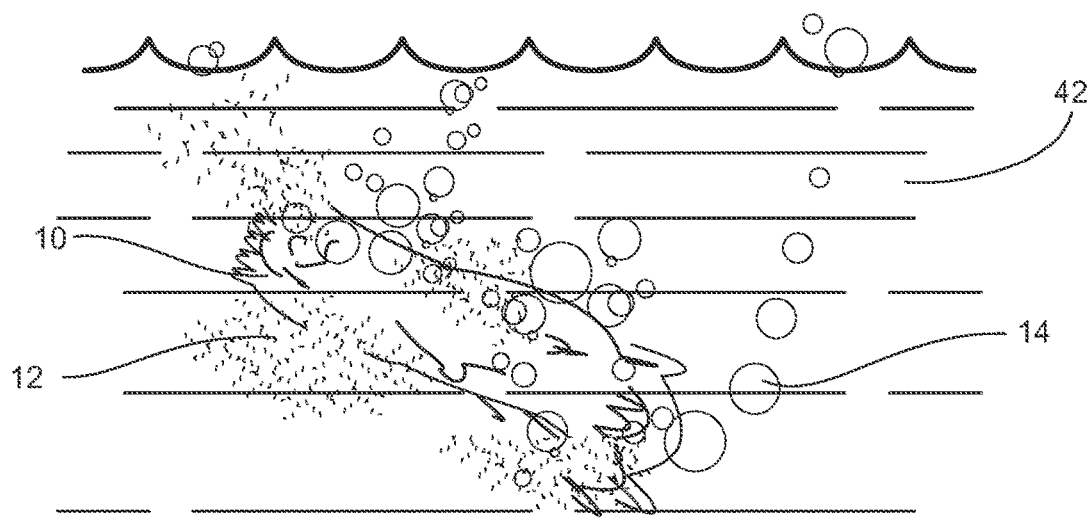
FIG. 6 is a side view of a pouch submerged in a fluid with the paper of the pouch dissolving and releasing the detergent.

Referring now to FIGS. 5 and 6, as the paper pouch 10 is submerged into water 42 the paper disintegrates 12 and fully dissolves in the water. At the same time, the detergent 14 from the paper pouch 10 is released so that the garments may be laundered.

The paper pouches 10 according to the present invention are preferably made from a Cellulose gum such as Carboxymethyl Cellulose. However, one skilled in the art will recognize that any dissolvable paper will work as a substitute and such is specifically contemplated in this application. The paper pouch 10 has a plain white color and is characterized by an absence of any other color.

The detergent 14 contained within pouch is made from Sodium Carbonate, C12-15 Pareth-2, and Sodium Metasilicate. However, other similar hypoallergenic dry detergent powders having no fillers or brighteners may be substituted.

Preferably, the paper pouch 10 is made on a form/fill machine (not shown). The machine forms the flat paper stock into a pouch, fills it with powder, 14, and seals it to produce the final product.

A dissolvable paper pouch 10 containing a detergent 14 according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims. It is envisioned that other embodiments may perform similar functions and/or achieve similar results. Any and all such equivalent embodiments and examples are within the scope of the present invention and are intended to be covered by the appended claims.

What is claimed is:

1. A method of detoxifying a load of fabric consisting of:
providing plurality of pouches wherein each pouch consists of a paper pouch and a powder detergent sealed within the paper pouch and wherein the paper pouch dissolves upon contact with liquid water thereby releasing the powder detergent;
cleaning the washing machine by placing a quantity of rags into a washing machine, placing one of the pouches into the washing machine, and operating the washing machine;
selecting the load of fabric to detoxify, placing the load of fabric into the washing machine, placing one of the pouches into the washing machine, and operating the washing machine;
placing one of the pouches into the washing machine after the washing machine has washed the fabric in the step above, and operating the washing machine;
placing one of the pouches into the washing machine after the washing machine has washed the fabric in the step above, and operating the washing machine; and
removing the detoxified fabric from the washing machine;
wherein the paper pouch is made from Carboxymethyl Cellulose;
wherein pouch has a plain white color and is characterized by an absence of any other color;
wherein the powder detergent is a laundry detergent for cleaning fabric, wherein the laundry detergent consists of Sodium Carbonate, C12-15 Pareth-2, and Sodium Metasilicate;
wherein the pouch is characterized by a lack of any fillers other than the powder detergent itself and the powder detergent is characterized by a lack of any perfumes, any coloring agents, and any brighteners;
wherein the pouch is produced on a form/fill machine;
wherein the paper pouch and the powder detergent is safe for septic wastewater treatment systems, biodegradable, and hypoallergenic; and
wherein the paper pouch is non-toxic.

* * * * *